(12) United States Patent
Aseev et al.

(10) Patent No.: US 11,334,443 B1
(45) Date of Patent: May 17, 2022

(54) TRUSTED DATA RESTORATION AND AUTHENTICATION

(71) Applicant: Acronis International GmbH, Shaffhausen (CH)

(72) Inventors: Eugene Aseev, Moscow Region (RU); Michael Chadwick, Chandler, AZ (US); Alexander Tormasov, Moscow (RU); Stanislav Protasov, Moscow (RU); Mark Shmulevich, Moscow (RU); Serguei Beloussov, Costa del Sol (SG)

(73) Assignee: ACRONIS INTERNATIONAL GMBH

( * ) Notice: Subject to any disclaimer, the term of this patent is extended or adjusted under 35 U.S.C. 154(b) by 435 days.

(21) Appl. No.: 15/868,349

(22) Filed: Jan. 11, 2018

Related U.S. Application Data (60) Provisional application No. 62/445,421, filed on Jan. 12, 2017.

(51) Int. Cl.
| | | |
|---|---|---|
| *G06F 16/00* | (2019.01) | |
| *G06F 11/14* | (2006.01) | |
| *H04L 9/32* | (2006.01) | |
| *H04L 29/06* | (2006.01) | |
| *H04L 9/06* | (2006.01) | |

(52) U.S. Cl.
CPC ...... *G06F 11/1469* (2013.01); *G06F 11/1464* (2013.01); *H04L 9/0637* (2013.01); *H04L 9/3247* (2013.01); *H04L 63/0272* (2013.01); *G06F 2201/805* (2013.01); *G06F 2201/82* (2013.01)

(58) Field of Classification Search
CPC .. G06F 21/602; G06F 16/1805; G06F 16/152; G06F 16/164; G06F 16/2365; G06F 16/182; G06F 11/1469; G06F 11/1464; G06F 2201/805; G06F 2201/82; H04L 9/0637; H04L 9/3247; H04L 63/0272
See application file for complete search history.

(56) References Cited

U.S. PATENT DOCUMENTS

| | | | |
|---|---|---|---|
| 6,081,875 A | * | 6/2000 | Clifton ............... G06F 11/1466 711/162 |
| 7,047,380 B2 | | 5/2006 | Tormasov et al. |

(Continued)

OTHER PUBLICATIONS

Watanabe et al., "Blockchain Contract: A Complete Consensus using Blockchain", 2015, IEEE. (Year: 2015).*

(Continued)

*Primary Examiner* — Jared M Bibbee
(74) *Attorney, Agent, or Firm* — K&L Gates LLP (57) ABSTRACT

A method and system for verified data restoration in storage systems is described. The method may include calculating a hash sum relating to initial data for storing in an archive and storing the data into the archive and storing the calculated initial hash sum into a blockchain network. The method may further include retrieving the data from the archive and calculating a retrieved hash sum of the retrieved data. The method may also include comparing the initial hash sum from the blockchain network with the retrieved hash sum. The method may additionally include restoring the data from the archive if the initial hash sum is equivalent to the retrieved hash sum.

19 Claims, 5 Drawing Sheets

(56) References Cited

U.S. PATENT DOCUMENTS

| | | | |
|---|---|---|---|
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,966,602 B1* | 6/2011 | Webster | G06F 8/48 717/114 |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,621,240 B1* | 12/2013 | Auchmoody | G06F 21/6272 713/193 |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 9,471,441 B1 | 10/2016 | Lyadvinsky et al. | |
| 9,760,448 B1 | 9/2017 | Per et al. | |
| 9,846,622 B1 | 12/2017 | Roguine et al. | |
| 9,858,154 B1 | 1/2018 | Lyadvinsky et al. | |
| 2006/0225065 A1 | 10/2006 | Chandhok et al. | |
| 2010/0011178 A1 | 1/2010 | Feathergill | |
| 2012/0204060 A1* | 8/2012 | Swift | G06F 11/1435 714/15 |
| 2018/0294957 A1* | 10/2018 | O'Brien | G06F 21/64 |

OTHER PUBLICATIONS

Qin et al., "Self-embedding fragile watermarking with restoration capability based on adaptive bit allocation mechanism", 2011, Elsevier. (Year: 2011).*

Linn et al., "Blockchain for Health Data and Its Potential Use in Health IT and Health Care Related Research", 2016, ONC/NIST Use of Blockchain For Healthcare and Research Workshop, Baltimore, MD, USA: ONC/NIST. (Year: 2016).*

* cited by examiner

TRUSTED DATA RESTORATION AND AUTHENTICATION

CROSS-REFERENCE TO RELATED APPLICATIONS

This application claims priority to and the benefit of U.S. Provisional Patent Application No. 62/445,421 filed on Jan. 12, 2017, the disclosure of which is herein incorporated by reference in its entirety.

TECHNICAL FIELD

The technical field may generally relate to data backup and restoration and more particularly to verifying the integrity of the data during restoration from memory.

BACKGROUND

Many systems use methods for backing up and storing all types of data. It can be important to be able to verify that the data was successfully saved such that the data saved during a backup is the same as the data that is retrieved during the restoration of the data. For example, if the data is particularly sensitive or is being saved for long periods of time, it may be necessary to confirm that any data restored from memory or an archive is verified as being authentic.

This problem is particularly problematic for any vital data such as, for example, official and financial documents, medical data of patients, financial transaction data, etc. Such types of data can be stored for decades, and any data losses or damages to them are problematic as a result of the sensitive and critical nature of such data.

The present application addresses this need and others.

BRIEF SUMMARY

In part, the disclosure relates to systems and methods configured to authenticate or verify the data content and the data integrity of data stored in one or more formats in a storage device for subsequent restoration. Authentication is used to initially process the data such that after it is stored it can be evaluated using one or more factors such as content verification, integrity verification and/or corruption checking.

The details of one or more implementations are set forth in the accompanying drawings and the description below. Other features and advantages will become apparent from the description, the drawings, and the claims.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect of the disclosure includes a method of verified data restoration in storage systems, the method including: calculating a hash sum relating to initial data for storing in an archive; storing the data into the archive and storing the calculated initial hash sum into a blockchain network; retrieving the data from the archive and calculating a retrieved hash sum of the retrieved data; and comparing the initial hash sum from the blockchain network with the retrieved hash sum; and restoring the data from the archive if the initial hash sum is equivalent to the retrieved hash sum. Other embodiments of this aspect include corresponding computer systems, apparatus, and computer programs recorded on one or more computer storage devices, each configured to perform the actions of the methods.

One general aspect of the disclosure includes a system for data restoration in storage systems, the system including: initial data to be archived; a monitoring system configured to calculate an initial hash sum relating to initial data; a blockchain network configured to receive and store the initial hash sum from the monitoring system; a restoration module configured to retrieve the data from an archive and calculate a retrieved hash sum related to the retrieved data and compare the initial hash sum to the retrieved hash sum; where the restoration module completed the restoration of the data if the initial hash sum is equivalent to the retrieved hash sum. Other embodiments of this aspect include corresponding computer systems, apparatus, and computer programs recorded on one or more computer storage devices, each configured to perform the actions of the methods.

One general aspect of the disclosure includes a computing system for restoring verified data from a storage system. The computing system includes one or more processors, wherein the one or more processors are configured to: in response to a data restoration request, retrieving the requested data from storage device; generate one or more parameters suitable for authenticating the requested data retrieved from the storage device; authenticate the requested data retrieved from the storage device using the one or more parameters by comparing the one or more parameters to the set of stored authentication parameters; and restore the requested data if the stored authentication parameters match the one or more parameters. In one embodiment, the one or more processors are further configured to: cancel restoration of the requested data if the stored authentication parameters do not match the one or more parameters.

In one embodiment, the one or more processors are further configured to: generate one or more stored authentication parameters using the requested data, upon or before storage of requested data in the storage device. In one embodiment, the one or more processors are further configured to: store the set of stored authentication parameters in a blockchain network. In one embodiment, the one or more parameters comprise a hash value or a hash sum. In one embodiment, the set of stored authentication parameters comprise a hash value or a hash sum.

In one embodiment, the requested data is a snap shot or one or more data files. In one embodiment, the one or more processors are further configured to: monitor data storage requests; generating one or more authentication parameters in response to a data storage request; and storing the one or more authentication parameters in a blockchain network. In one embodiment, the one or more processors are further configured to: verify integrity of requested data. In one embodiment, the requested data stored in the storage device is a copy-on-write snapshot of one or more files. In one embodiment, the one or more authentication parameters are a hash sum of the snapshot or a hash of a plurality of snapshot hashes.

DETAILED DESCRIPTION

Overview

In part, the disclosure relates to methods and systems for providing improvements in data backup and storage by verifying the data content and/or integrity of the data during the process of restoring the data from storage. The data is initially authenticated using a hash function or other authentication scheme such that the authentication information can be subsequently used to verify the data integrity and/or data content. In particular, when storing data into an archive or creating backup copies of the data or snapshotting the data, a data authentication process is used to before the data is stored so the integrity of the data content can be verified when the data is restored. Stored data content in various formats such as an archive, backup storage, snap shots and others can processes described herein. The advantages of this process typically include the decreased likelihood of losing or damaging data, especially sensitive data that is stored long-term in all be authenticated as part of one or more of the trusted data storage and restoration an archive.

Specifically, a given implementation of the systems and methods described herein can ensure that data restored from a backup database or an archive is exactly the same as the data that was stored in a disk memory or other storage systems. For example, in one embodiment the data being stored can be authenticated using hash sums calculated for the stored data. In part, the disclosure relates to methods and systems to verify the integrity of the data such that the data is uncorrupted and can be restored. Additionally, the systems and methods are configured to authenticate or verify the content of the data such that the data that is being archived will be the same data that is ultimately restored when or if such a restoration is performed. The processes and systems can be implemented with regard to cloud computing, software as a service, and other computing environments to improve backup and recovery of data files. In general, the methods and systems described herein are suitable for facilitating file restoration and authentication if data has been corrupted or affected by ransomware, malware, or other events.

A cloud provider or system administrator may institute backup and recovery or other procedures to ensure persistence and/or security of applications, data, or other resources accessed through one or more physical or virtual machines. Fault tolerant storage systems may be used to ensure data availability in the event of storage device failure or other system issues.

A storage system may include a number of storage servers or a set of disks (e.g. HDDs or hard disk drives). The storage system may be managed with software for archiving and storing data. User data, which may be stored on the storage system, may include any digital information stored by a user (e.g., files, photos, software, data bases etc.). A data archive may be a file format used to store user data on the storage system. Any sort of data type can be archived, authenticated and restored, such as files and snapshots, for example. Further, a data stream may be a continuous stream of user data set to be archived. Authentication parameters can be generated at or before the time of data storage and used to compare to parameters generated at a later time using the same process used initially to generate the authentication parameters. Hashing is an example of a suitable process. The initially generated parameters can be stored in a secure network such as a blockchain network or other secure environment.

In view of the forgoing, there may be a need for a storage system which can authenticate data that is stored during a backup operation or into archive. The techniques and features described in the present disclosure may improve backup or archiving storage and retrieval by, for example, authenticating the data to ensure successful storage and retrieval.

Figure 1:
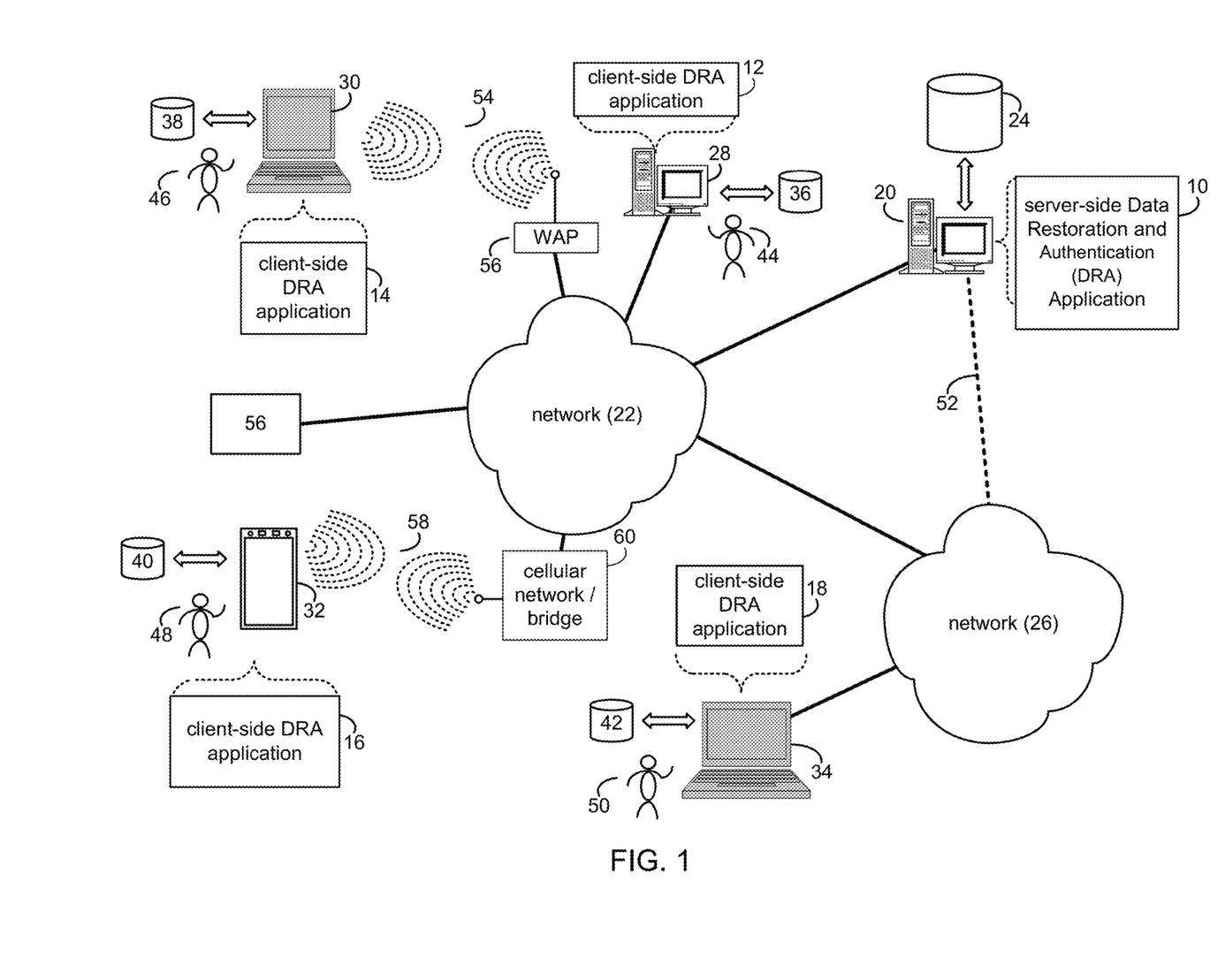
FIG. 1 depicts an example system that can execute implementations of the present disclosure relating to trusted data restoration and authentication with regard to data content and data integrity.

Referring to FIG. 1, there is shown a server-side data restoration and authentication (DRA) application 10 and client-side data restoration and authentication (DRA) applications 12, 14, 16, and 18. Server application 10 and/or one or more of client applications 12, 14, 16, and/or 18 may execute one or more processes configured to carry out one or more of the features described herein. Each of these applications can include two or more applications such as a monitoring application, a restore application, a blockchain transmission application, an authentication application, and other applications, agents and modules as suitable to implement the embodiments disclosed herein.

Server application 10 may be referred to as a process configured to carry out one or more of the features described herein, such as process 10. Further, one or more of client applications 12, 14, 16, and 18 may be referred to as a process configured to carry out one or more of the features described herein, such as processes 12, 14, 16, and/or 18.

As will be discussed below and referring now to FIG. 2, the data restoration process or application 10, 12, 14, 16, or 18 may store and retrieve data in such a way that the integrity of the data is verified. The process 10, 12, 14, 16, or 18 may authenticate the data before it is stored in an archive or backup storage. The process 10, 12, 14, 16, or 18 may further restore the data by verifying the integrity of the data. This can be achieved by determining if the restored data is the same as the data that was stored by the process 10, 12, 14, 16, or 18.

The data restoration process may be a server-side process (e.g., server-side data restoration process 10), a client-side process (e.g., client-side data restoration process 12, client-side data restoration process 14, client-side data restoration process 16, or client-side data restoration process 18), or a hybrid server-side/client-side process (e.g., a combination of server-side data restoration process 10 and one or more of client-side data restoration processes 12, 14, 16, 18).

System Overview

Referring to FIG. 1, server-side data restoration and authentication (DRA) process 10 may reside on and may be executed by server computer 20, which may be in communication with network 22 (e.g., the Internet or a local area network). In one embodiment, all of the DRA processes shown in FIG. 1 are designed to be secure and trusted processes by which data selected for storage is authenticated for data integrity and data content such that both factors can be verified upon restoration of such data. Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially.

For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side data restoration process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM). All of the components shown in FIG. 1 can include communication software and software routines that allow each of them to route data to and from a block chain network.

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side data restoration and authentication (DRA) processes/applications 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side data restoration and authentication processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side data restoration and authentication processes 12, 14, 16, 18 and/or server-side data restoration and authentication process 10 may be processes that run within (i.e., are part of) a cloud computing site, cloud computing application, cloud platform, or cloud environment. Alternatively, client-side data restoration and authentication processes 12, 14, 16, 18 and/or server-side data restoration and authentication process 10 may be stand-alone applications that work in conjunction with the cloud computing site, cloud computing application, cloud platform, or cloud environment. One or more of client-side data restoration and authentication processes 12, 14, 16, 18 and server-side data restoration and authentication process 10 may interface with each other (via network 22 and/or network 26).

Users 44, 46, 48, 50 may access server-side data restoration and authentication process 10 directly through the device on which the client-side data restoration and authentication process (e.g., client-side data restoration and authentication processes 12, 14, 16, 18) is executed, namely client electronic devices 28, 30, 32, 34, for example. Users 44, 46, 48, 50 may access server-side data restoration and authentication process 10 directly through network 22 and/or through secondary network 26. Further, server computer 20 (i.e., the computer that executes server-side data restoration and authentication process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22.

WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Trusted Data Restoration and Authentication Process

For the following discussion, server-side data restoration and authentication process 10 will be described for illustrative purposes and server computer 20 may run server-side data restoration and authentication application 10 to carry out some or all of the techniques and features described here. It should be noted that server-side data restoration and authentication process 10 may interact with client-side data restoration and authentication process 12 and may be executed within one or more applications that allow for communication with client-side data restoration and authentication process 12.

However, this is not intended to be a limitation of this disclosure, as other configurations are possible (e.g., stand-alone, client-side data restoration and authentication processes and/or stand-alone server-side data restoration and authentication processes). For example, some implementations may include one or more of client-side data restoration and authentication processes 12, 14, 16, and 18 in place of or in addition to server-side data restoration and authentication process 10.

The systems and methods (e.g., data restoration and authentication process 10) described herein relate to physical or virtual machine backups, snapshots, hash values, combinations or sums of hash values, archives, data, files, and/or folders. In part, the systems and methods relate to improving the reliability of backup or archiving operation by authenticating the data to ensure its integrity. The systems described herein may include one or more memory elements for backup of software, databases, user data, and physical or virtual machines.

Referring now to FIG. 1, one or more of users 44, 46, 48, and 50 may be cloud administrators or system administrators or may be cloud or system end-users. The cloud or system administrators may access and/or administer server computer 20 or client electronic devices 28, 30, 32, 34 (respectively). In an embodiment one or more of server computer 20 or client electronic devices 28, 30, 32, 34 may be a physical computer system, virtualization host device, or cloud computing client. The virtualization host device may include a virtual machine and may run a cloud or virtualization application such as VMWare™ or may include a bare-metal embedded hypervisor (e.g. VMware™ ESX™ and VMware™ ESXi™).

Further, the virtualization host device may include a vCloud™ architecture that may enhance cooperation between hypervisors. The data restoration and authentication processes 10, 12, 14, 16, and/or 18 may include or may work in connection with an agent (e.g., a software module), which may include or may be configured to perform any number of the techniques or features described herein.

The data restoration and authentication processes 10, 12, 14, 16, and/or 18 may include a software component, executable code, function, subroutine, or other set of instructions designed to carry out one or more operations for a data restoration and authentication that store and retrieve data in such a way that the integrity of the data is verified. The techniques, features, and/or operations described herein may improve the reliability of stored and retrieved data.

For example, the techniques, features, and/or operations described herein may ensure the reliability of data and that the data has been compromised by being damaged or corrupted intentionally or accidentally, modified, replaced with other data, or encrypted by malware. In addition, in the event of ransomware attack, the systems and methods can be used to authenticate the data being restored. This is desirable in the event the ransomware is sophisticated enough to tamper with the contents of archives, backups, snap shots and other formats of stored data.

For example, the techniques, features, and/or operations described herein may authenticate the data during data storage before the data is placed into a storage system or archive, and verify the data when the data is being restored from storage.

Figure 2:
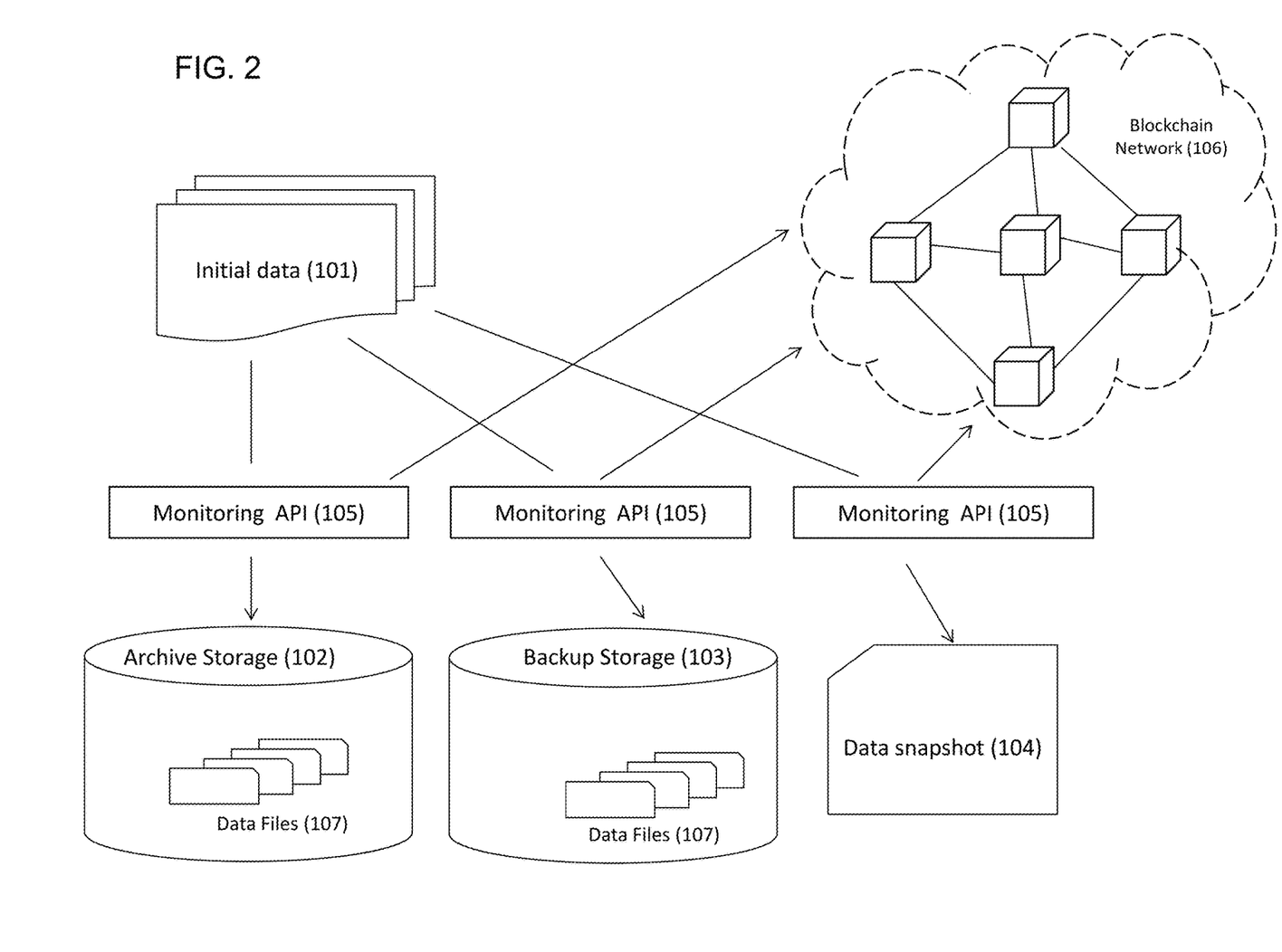
FIG. 2 is a diagrammatic flowchart illustrating an exemplary architecture for trusted data storage in accordance with implementations of the present disclosure for various storage formats.

Referring now to FIG. 2, one or more methods for authentication of data during data storage are described. For example, in one embodiment, the data is authenticated before it is stored into backup storage or an archive. A monitoring system 105 can perform a plurality of functions when the data 101 is being backed up or archived. The monitoring system 105 can be part of a backup agent that performs backup operations, or it can be integrated into a storage system, such as an archive storage 102, or a backup storage 103. For example, the monitoring system 105 can be any commercial cloud storage system, including but not limited to Amazon S3, MS Azure, or Google Cloud Storage that implements a monitoring application programming interface suitable for performing the steps described herein.

The monitoring system 105 detects the backup or archiving processes, and performs the authentication of the data 101. The authentication of data 101 can occur in a variety of ways, but in the exemplary embodiment the monitoring system 105 calculates one or more authentication parameters such as a hash sum for all or a portion of the data 101, including any files or data chunks. The calculated hash sum is sent to a distributed network such as a blockchain network 106 for storage. The blockchain network 106 is a distributed and decentralized database that stores records safely and securely. The stored records can be easily verified. Thus, it can be determined whether or not data has been modified or changed in any way when data is signed with a blockchain record. The blockchain network 106 can be any blockchain-like storage system, including but not limited to the Ethereum project.

For additional protection, for example, against ransomware, the data 101 can also include a snapshot 104. A hash sum of the snapshot 104 can also be stored in the blockchain network 106. Other authentication parameters that can be generated and subsequently compared to parameters generated at a later time for snapshots can also be used without limitation.

Referring now to FIGS. 3A, 3B, 4 and 5, one or more methods for verified data restoration and authentication are described. For example, in an embodiment, data is saved into storage or an archive. This archive can be a file, an application, a data set, or other archive or information. The data created may be in any form and the data may exist in any format.

The data may be stored on local storage (e.g., a hard drive, flash drive etc.) or may be backed up into an archive. For example, referring now to FIG. 3A, the data or copy of the data may be uploaded in storage 200. A hash sum of the data may be calculated, or the hash of the hashes of several chunks of data may be calculated 202. These are all exemplary authentication parameters. In one embodiment, the calculated hash is sent to a blockchain network for storage 204 to be used in the verification of the stored data upon its retrieval.

Figure 3A:
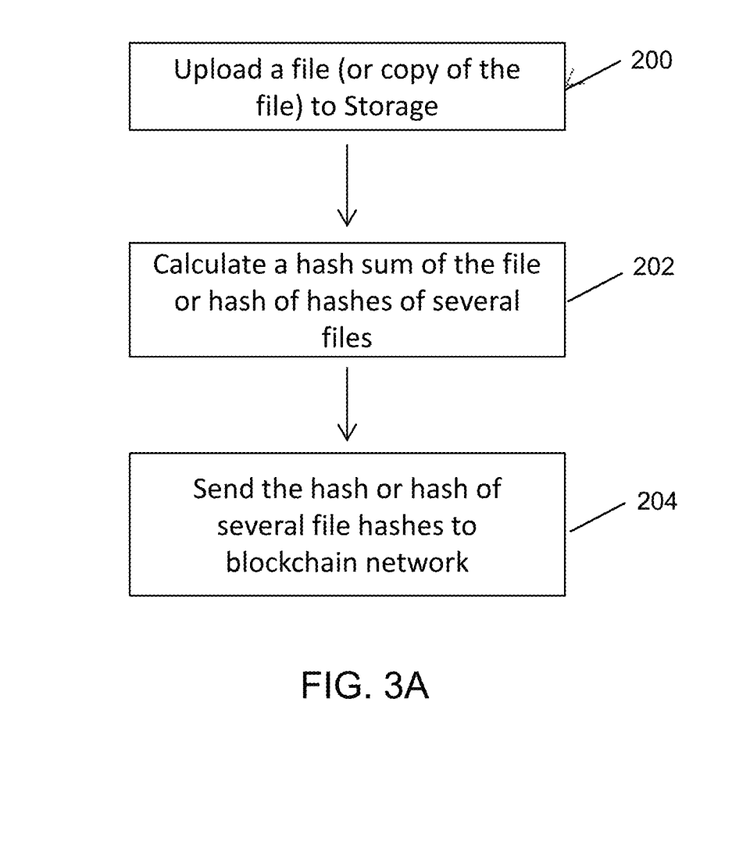
FIGS. 3A and 3B are flowcharts illustrating exemplary embodiments for authenticating data being stored in storage systems in accordance with the present disclosure.
Figure 3B:
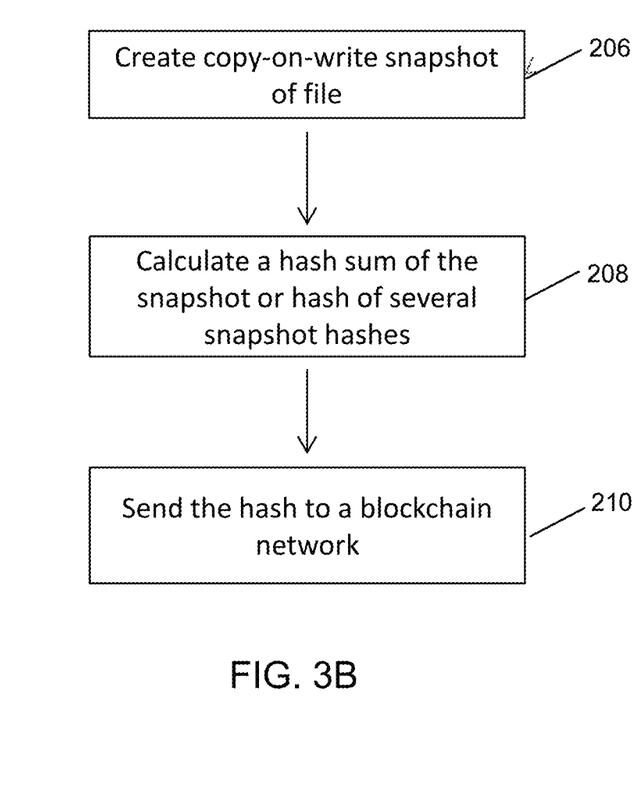

In another example process flow as shown in FIG. 3B, a copy-on-write snapshot of data or a file can be created 206. A hash sum of the snapshot may be calculated, or the hash of the hashes of several snapshots may be calculated 208. These are all exemplary authentication parameters. The calculated hash is sent to a blockchain network for storage 210 to be used in the verification of the stored data upon its retrieval.

During restoration of the data, a verification process is used to ensure that the restored data is the same as the data that was stored in the storage or archive. A restoration module 308, as shown in FIG. 4, can be used to retrieve the data from storage and verify the data before the restoration process is complete.

Figure 4:
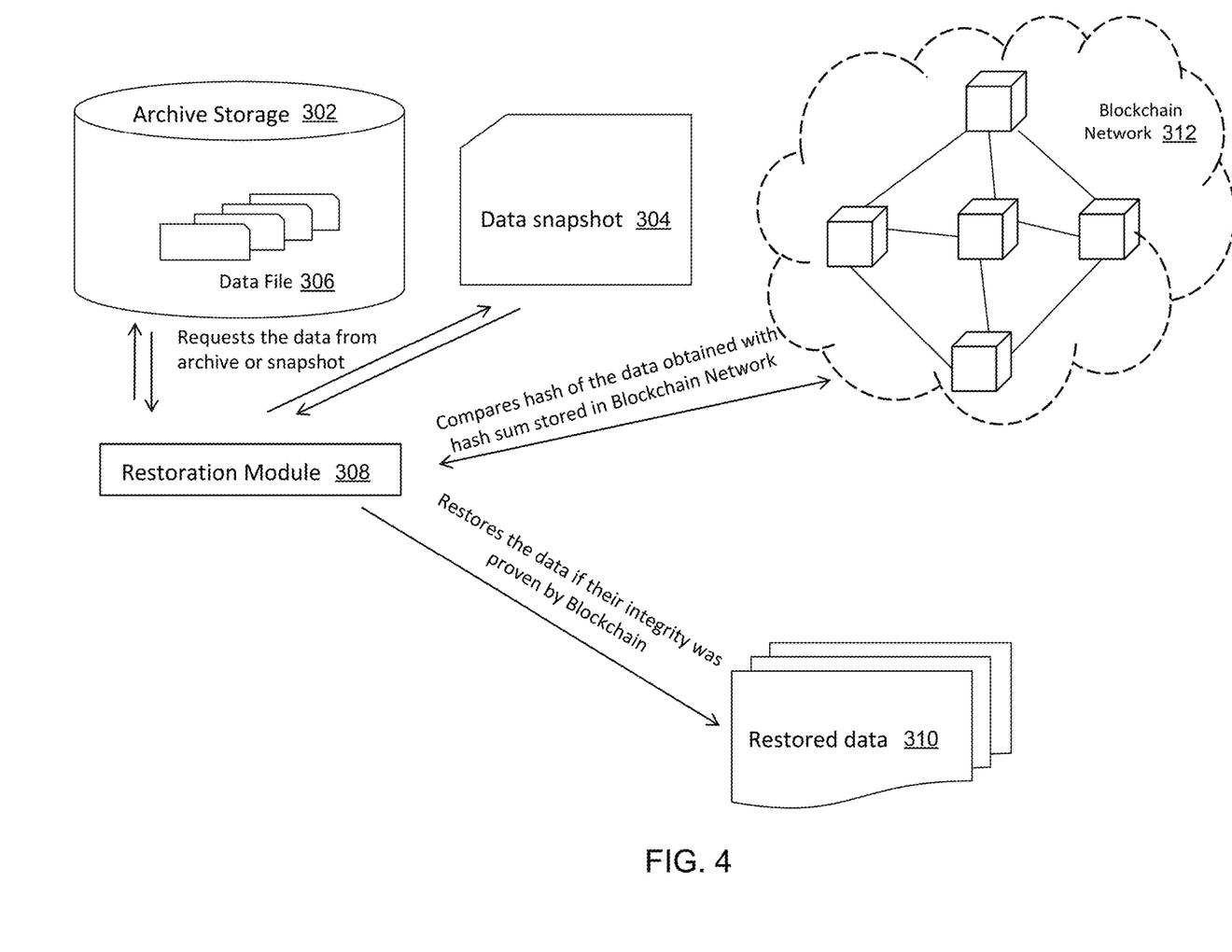
FIG. 4 is a diagrammatic flowchart illustrating an example architecture for trusted data restoration in accordance with implementations of the present disclosure.
Figure 5:
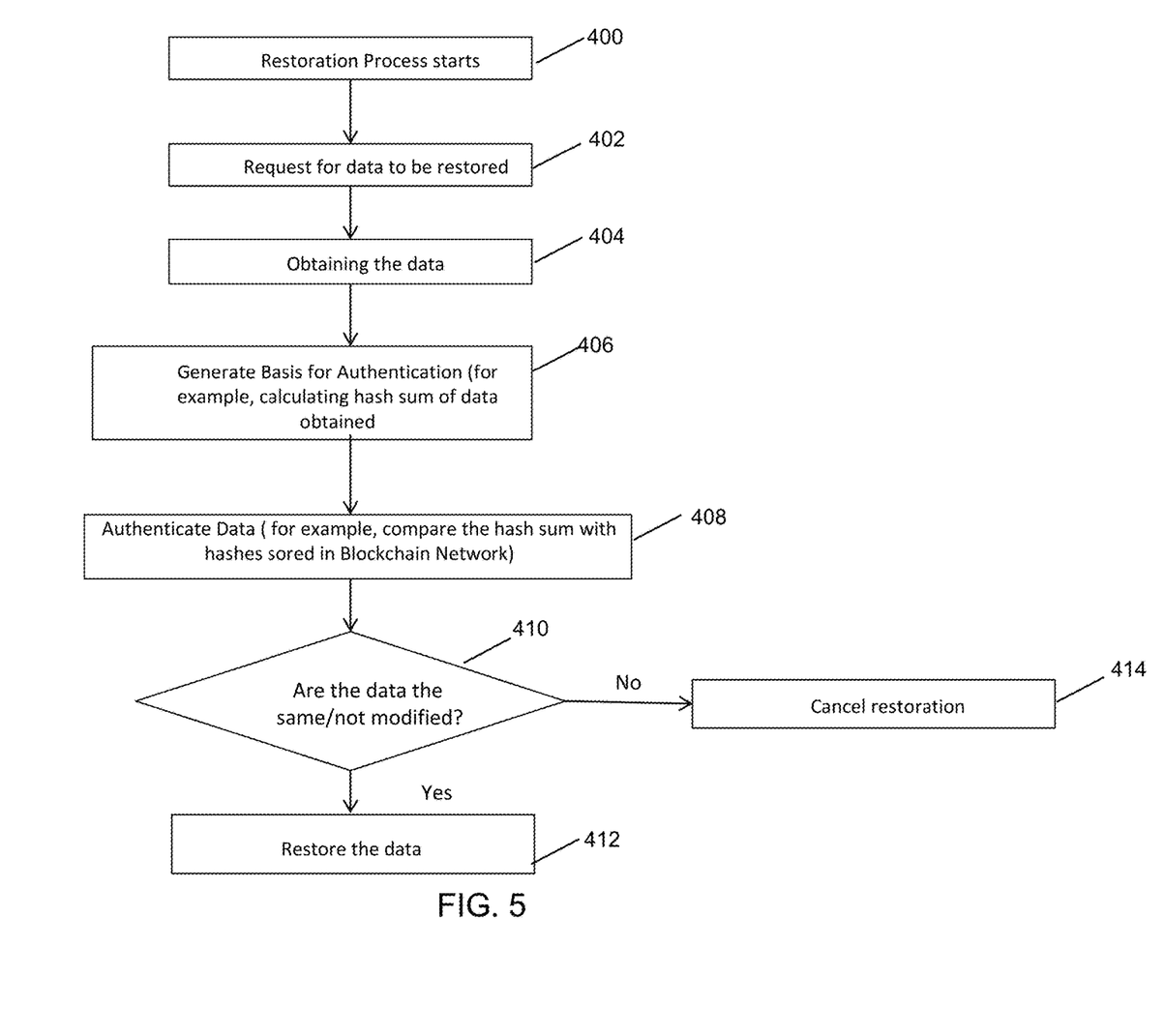
FIG. 5 is a flowchart illustrating an example process for trusted data restoration in storage systems in accordance with the present disclosure.

Referring to FIGS. 4-5, at the start of the restoration process 400, a request for data to be restored 402 is send to archive storage 306 or to a snapshot storage 304 from the restoration module 308. The data files 306 are retrieved 404 from archive storage 302, or from a data snapshot 304. The authentication parameters such as a hash sum of the data is calculated 406 by the restoration module 308, and the calculated hash sum is compared 408 to a corresponding hash sum stored in a blockchain network 312. This comparison is used to determine if the data 306 is the same as when it was stored or if the data has been modified and compromised 410. If the calculated hash sum and the corresponding hash sum in the blockchain network 312 are equivalent 412, the data 306 is authenticated. In turn, such data can be restored 310 by the restoration module 308. If the calculated hash sum and the corresponding hash sum in the blockchain network 312 are not equivalent 414, the restoration of the data 306 is canceled.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the disclosure. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the disclosure. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method of restoring verified data from a storage system, the method comprising:
    initially authenticating data prior to storing in a storage device;
    in response to a data restoration request, retrieving the requested data from the storage device;
    generating one or more parameters suitable for authenticating the requested data retrieved from the storage device;
    storing the one or more parameters in a blockchain network;
    authenticating, using a monitoring system, the requested data retrieved from the storage device using the one or more parameters by comparing the one or more parameters to a set of stored authentication parameters;
    determining the data has not been modified if the one or more stored parameters are signed with a block chain record; and
    restoring the requested data if the stored one or more parameters match the one or more parameters and if the one or more stored parameters are signed with the block chain record.

2. The method of claim 1 further comprising cancelling restoration of the requested data if the stored authentication parameters do not match the one or more parameters.

3. The method of claim 1 further comprising generating one or more stored authentication parameters using the requested data, upon or before storage of requested data in the storage device.

4. The method of claim 1 wherein the one or more parameters comprise a hash value or a hash sum, wherein the monitoring system is a cloud storage system.

5. The method of claim 4 wherein the set of stored authentication parameters comprise a hash value or a hash sum.

6. The method of claim 1 wherein the requested data is a snap shot or one or more data files, wherein a hash sum of the snapshot is also stored in the blockchain network.

7. The method of claim 1 further comprising monitoring data storage requests; generating one or more authentication parameters in response to a data storage request; and storing the one or more authentication parameters in the blockchain network.

8. The method of claim 1 further comprising verifying integrity of requested data.

9. The method of claim 1 wherein the requested data stored in the storage device is a copy-on-write snapshot of one or more files.

10. The method of claim 9 wherein the one or more authentication parameters are a hash sum of the snapshot or a hash of a plurality of snapshot hashes.

11. A computing system for restoring verified data from a storage system, the computing system comprising one or more processors, wherein the one or more processors are configured to:
    initially authenticating data prior to storing in a storage device;
    in response to a data restoration request, retrieving the requested data from the storage device;
    generate one or more parameters suitable for authenticating the requested data retrieved from the storage device, wherein the requested data comprises a snapshot;
    store the set of one or more parameters in a blockchain network;
    authenticate the requested data retrieved from the storage device using the one or more parameters by comparing the one or more parameters to the set of stored authentication parameters;

determine the data has not been modified if the one or more stored parameters are signed with a block chain record; and restore the requested data if the stored one or more parameters match the one or more parameters and if the one or more stored parameters are signed with the block chain record.

12. The computing system of claim 11, wherein the one or more processors are further configured to:

cancel restoration of the requested data if the stored authentication parameters do not match the one or more parameters.

13. The computing system of claim 11, wherein the one or more processors are further configured to:

generate one or more stored authentication parameters using the requested data, upon or before storage of requested data in the storage device.

14. The computing system of claim 11, wherein the one or more parameters comprise a hash value or a hash sum.

15. The computing system of claim 14, wherein the set of stored authentication parameters comprise a hash value or a hash sum.

16. The computing system of claim 11, wherein the one or more processors are further configured to:

monitor data storage requests; generating one or more authentication parameters in response to a data storage request; and storing the one or more authentication parameters in the blockchain network.

17. The computing system of claim 11, wherein the one or more processors are further configured to:

verify integrity of requested data.

18. The computing system of claim 11, wherein the snapshot is a copy-on-write snapshot of one or more files, wherein a hash sum of the copy-on-write snapshot is also stored in the blockchain network.

19. The computing system of claim 13, wherein the one or more authentication parameters area hash sum of the snapshot or a hash of a plurality of snapshot hashes.

* * * * *